(12) United States Patent
Lin

(10) Patent No.: US 7,059,241 B2
(45) Date of Patent: Jun. 13, 2006

(54) CUTTER BLADE OF A FRUIT AND VEGETABLE JUICE EXTRACTOR

(76) Inventor: Kuan-Chih Lin, PMB#1008, 1867 Ygnacio Valley Rd., Walnut Creek, CA (US) 94598

( * ) Notice: Subject to any disclaimer, the term of this patent is extended or adjusted under 35 U.S.C. 154(b) by 121 days.

(21) Appl. No.: 10/913,389

(22) Filed: Aug. 9, 2004

(65) Prior Publication Data
US 2006/0027107 A1    Feb. 9, 2006

(51) Int. Cl.
*A23N 1/00* (2006.01)
*A23N 1/02* (2006.01)
*A47J 43/046* (2006.01)
*A47J 43/07* (2006.01)
*A23L 1/00* (2006.01)

(52) U.S. Cl. .......... 99/511; 99/513

(58) Field of Classification Search ........... 99/348, 99/492, 509–513, 485, 495; 366/205, 206, 366/96–98, 197, 199, 314, 315, 342, 343; 241/282.1, 282.2, 282.5, 292.1, 199.12, 37.5, 241/92, 285.1, 285.2; 426/518, 519; 403/206, 403/300
See application file for complete search history.

(56) References Cited

U.S. PATENT DOCUMENTS

| | | | | |
|---|---|---|---|---|
| 5,669,289 A | * | 9/1997 | Chen | 99/511 |
| 6,202,547 B1 | * | 3/2001 | Tseng et al. | 99/511 |
| 6,397,736 B1 | * | 6/2002 | Tseng et al. | 99/511 |
| 6,609,455 B1 | * | 8/2003 | Fouquet | 99/511 |
| 6,813,997 B1 | * | 11/2004 | Lin | 99/511 |

* cited by examiner

Primary Examiner—Timothy F. Simone
(74) Attorney, Agent, or Firm—Leong C. Lei

(57) ABSTRACT

A cutter blade of a fruit and vegetable juice extractor is disclosed. The cutter blade has a blade center region being provided with a plurality of center teeth blades, and the center teeth blades are formed from a blade and the body of the blade and the height of the blades are greater than a separate teeth blade, thereby the crushing of the center region of the food stuff by the blade cutter is improved.

2 Claims, 7 Drawing Sheets

CUTTER BLADE OF A FRUIT AND VEGETABLE JUICE EXTRACTOR

BACKGROUND OF THE INVENTION (a) Technical Field of the Invention

The present invention relates to cutter blades, and in particular to a cutter blade of a juice extractor having a center blade with teeth, which facilitates the cutting of the center portion of food stuff.

(b) Description of the Prior Art

FIGS. 1 to 4 indicate conventional fruit and vegetable juice structure comprising a press component 11, a top cover 12, a rotating cutter blade 13, a machine body 14, a residual container 15 and a motor 16. The juice structure cuts fruit and vegetable into small pieces, and the press component 11 presses the food stuff together with the rotating cutter blade 13 driven by the motor 16. The extracted juice is filtered via the filter 132 and is collected. However, due to the hardness/softness of the food stuff, some parts of the fruit and vegetable may not be properly or thoroughly crushed, or the food stuff cannot be crushed sufficiently to provide juice. In addition, if the press component 11 is forced downward, the motor 16 could be overloaded, or the blind area D of the conventional juice extractor is generated.

SUMMARY OF THE INVENTION

Accordingly, it is an object of the present invention to provide a cutter blade structure of a fruit and vegetable juice extractor comprising a press component, a top cover, a cutter blade, a machine body, a residual container and a motor, the blade on the cutter blade included teeth blades which are formed from a plurality of independent teeth blade, and the teeth blades were arranged radially to define a blade center region, characterized in that the blade center region is provided with a plurality of center teeth blade, and the center teeth blade is formed from a blade and the body of the blade and the height of the blade are greater than a separate teeth blade, thereby the crushing of the center region of the food stuff by the blade cutter is improved.

Yet another object of the present invention is to provide a cutter blade of a fruit and vegetable juice extractor, wherein the directions of the blades define various blade directions into at least two sets of teeth blade groups.

Still another object of the present invention is to provide a cutter blade of a fruit and vegetable juice extractor, wherein the center blade can eliminate the blind cutting area formed on the cutter blade so that the crushing efficiently is improved.

Still yet another object of the present invention is to provide a cutter blade of a fruit and vegetable juice extractor, wherein the center region of the cutter blade is provided with a plurality of center teeth blade which is divided into two groups with opposite blade direction.

Still a further object of the present invention is to provide a cutter blade of a fruit and vegetable juice extractor, wherein the center teeth blade is formed as single unit from the cutter blade. This will simplify the component of the cutter blade and reduce the cost of blade production.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
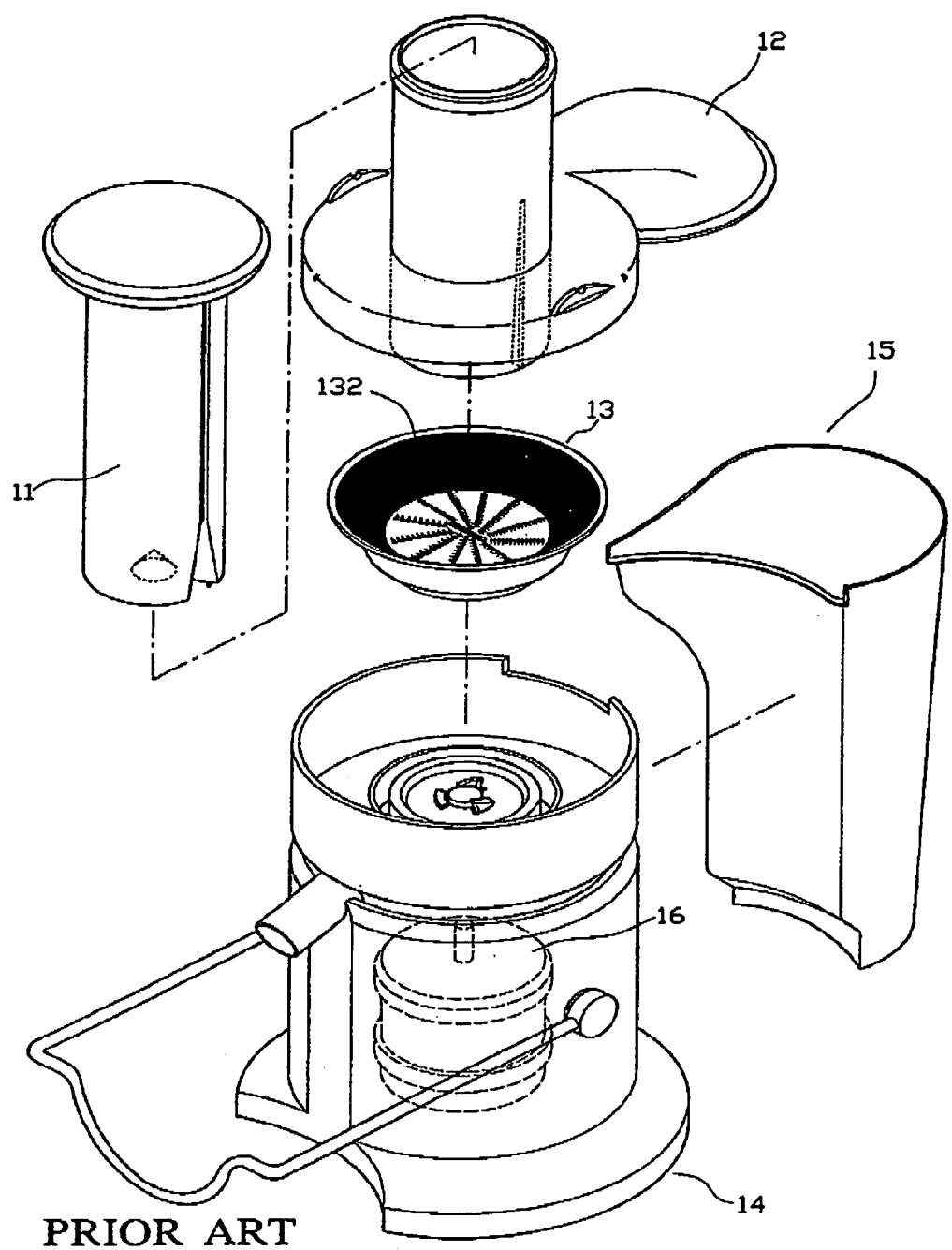
FIG. 1 is a perspective view of a conventional fruit and vegetable juice extractor.
Figure 2:
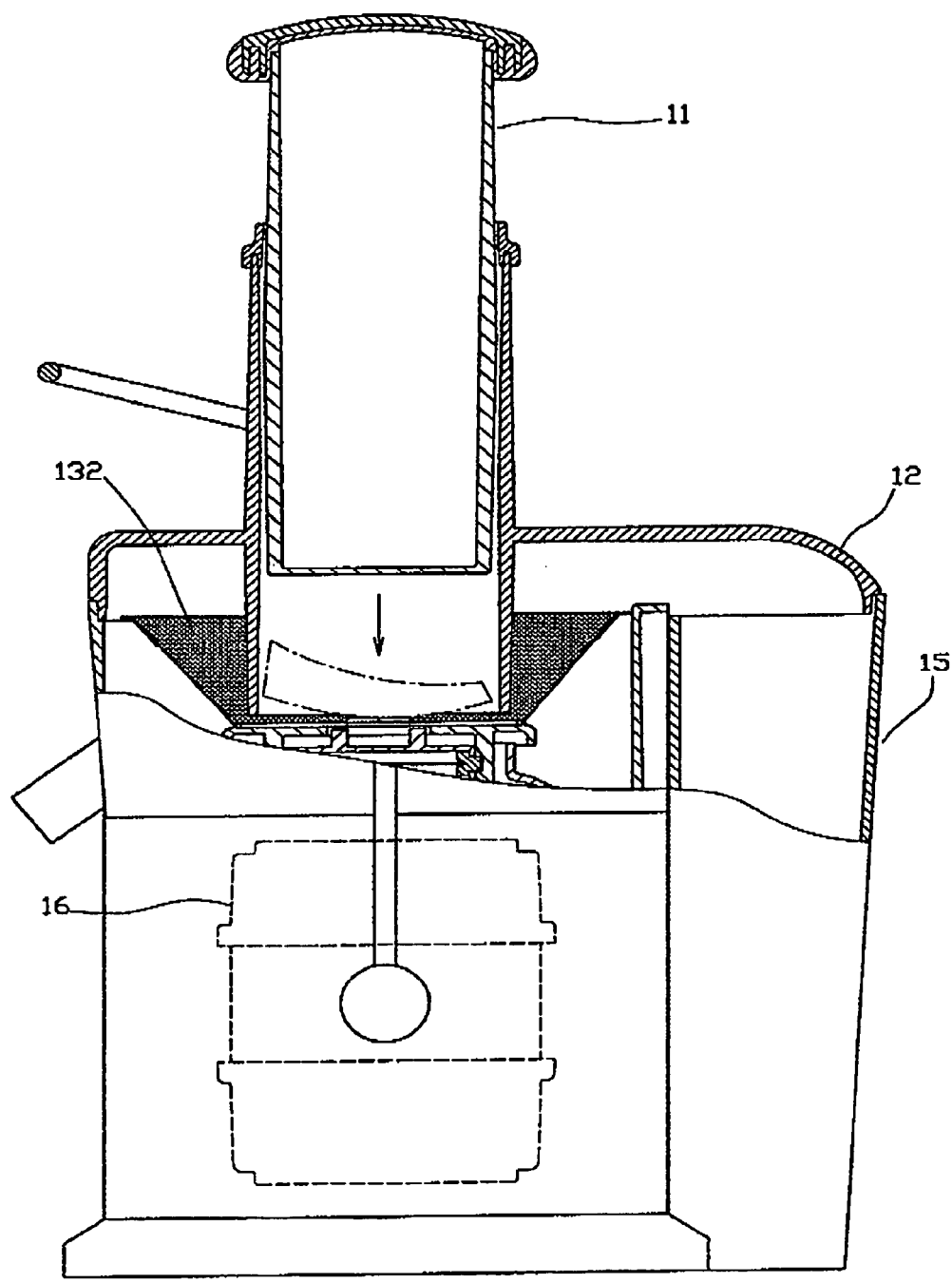
FIG. 2 is a side view of FIG. 1.
Figure 3:
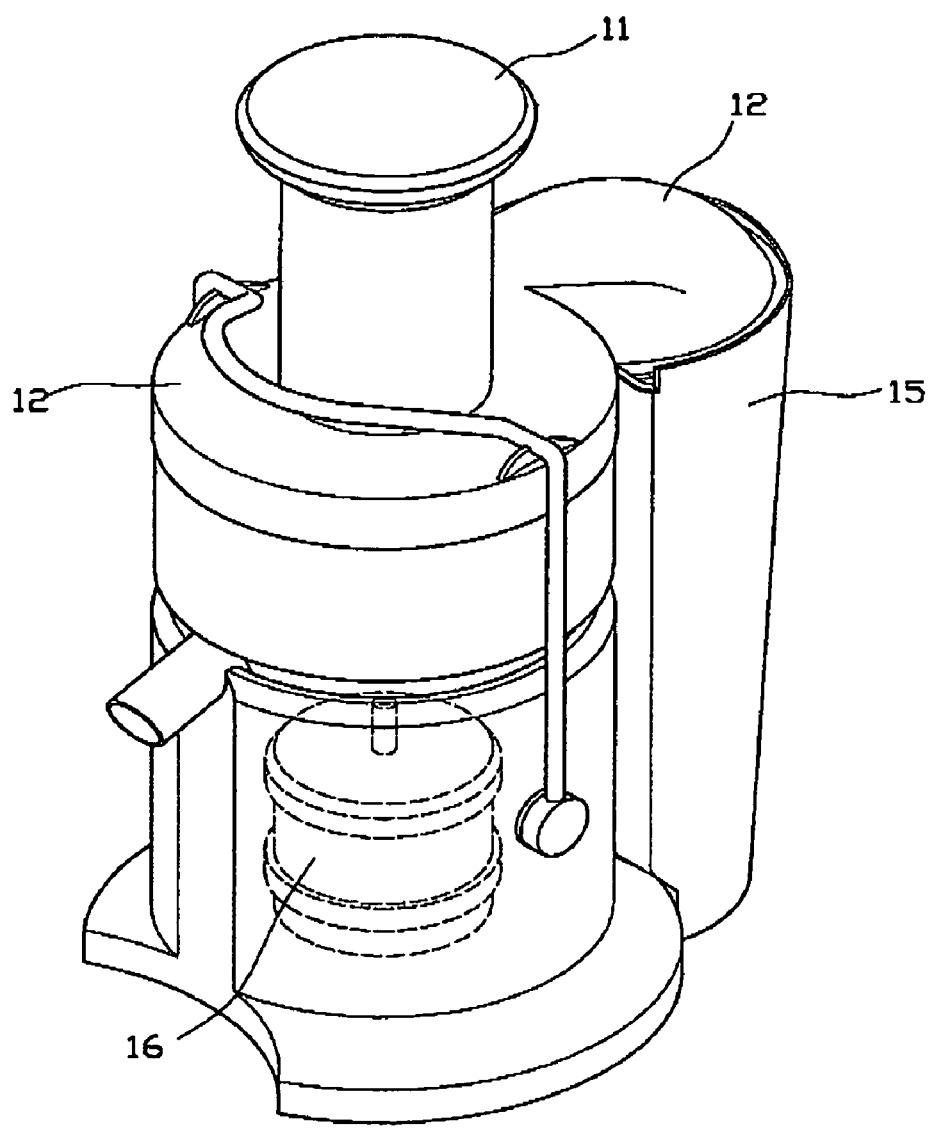
FIG. 3 is another perspective view of FIG. 1.
Figure 4:
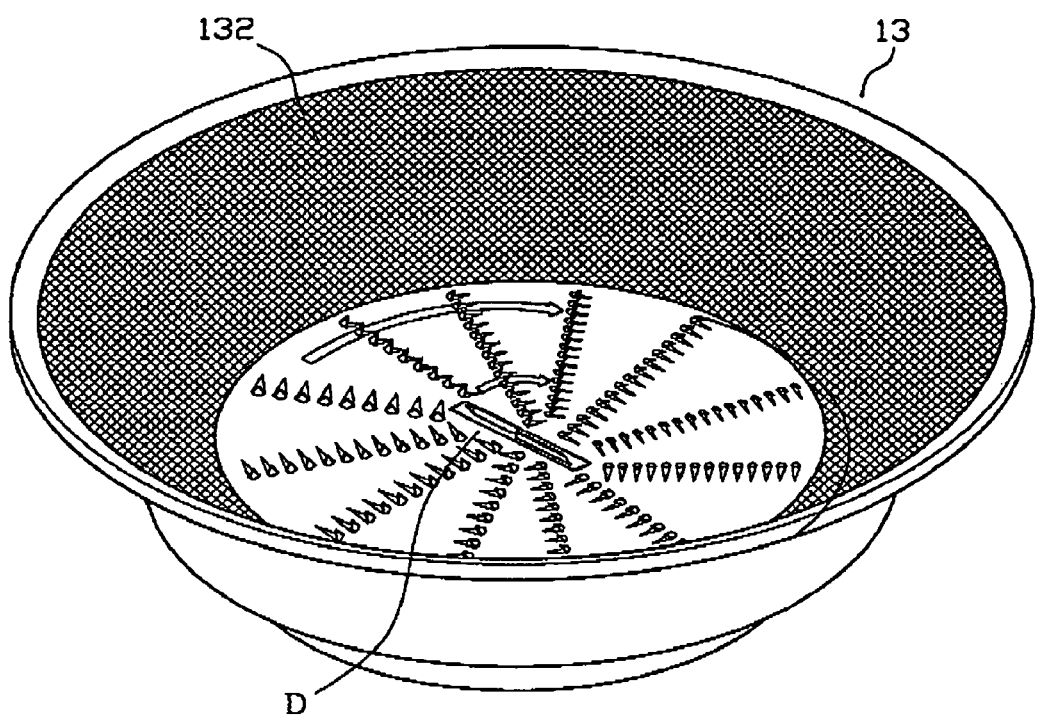
FIG. 4 is a perspective view of a blade cutter of a conventional fruit and vegetable.
Figure 5:
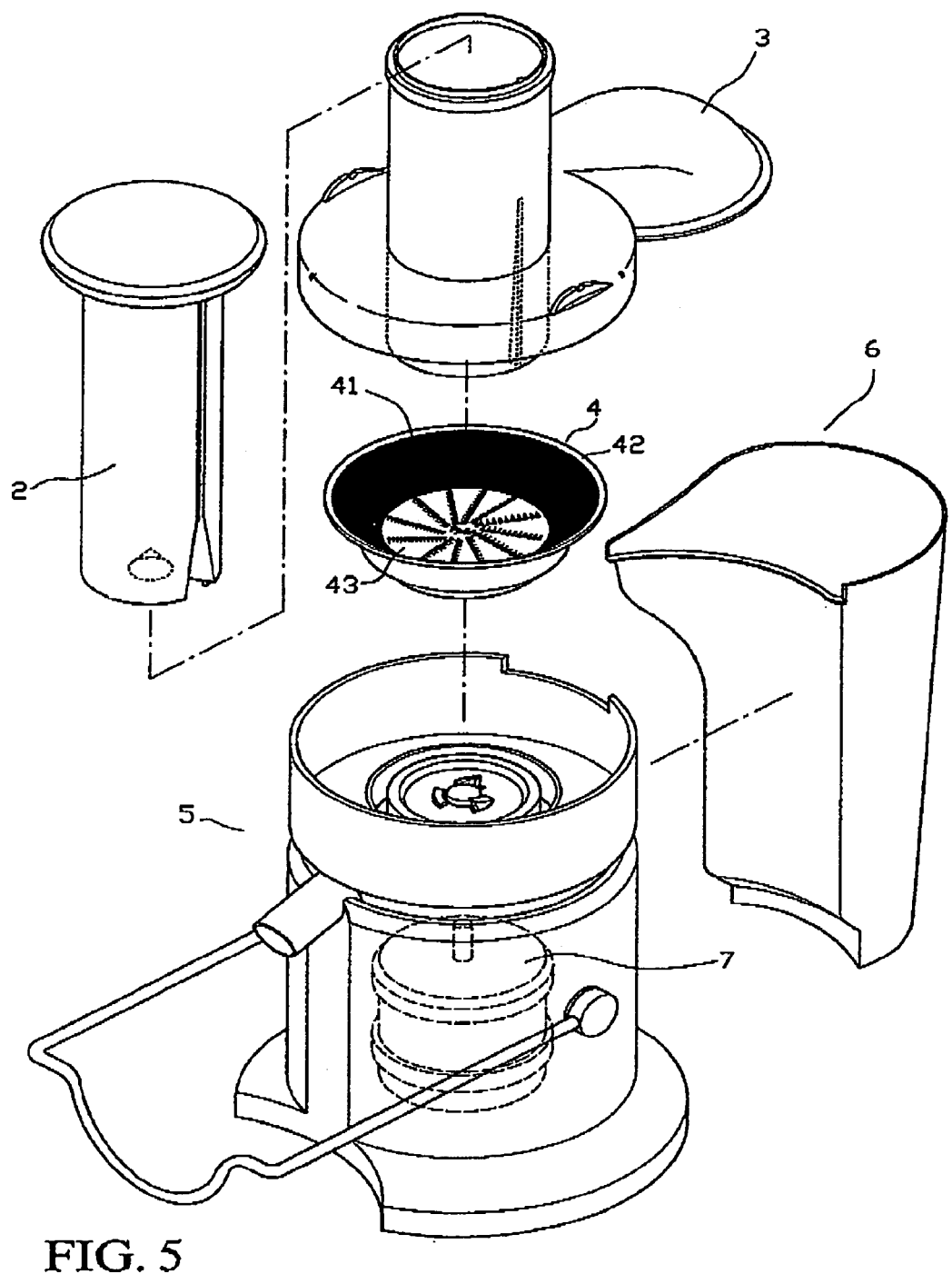
FIG. 5 is a perspective view of the present invention.

Referring to FIG. 5, there is shown a fruit and vegetable juice extractor according to the invention comprising a press component 2, a top cover 3, a cutter blade 4, a machine body 5, a residual container 6 and a motor 7. The improvement in accordance with the present is on the cutter blade 4.

Figure 6:
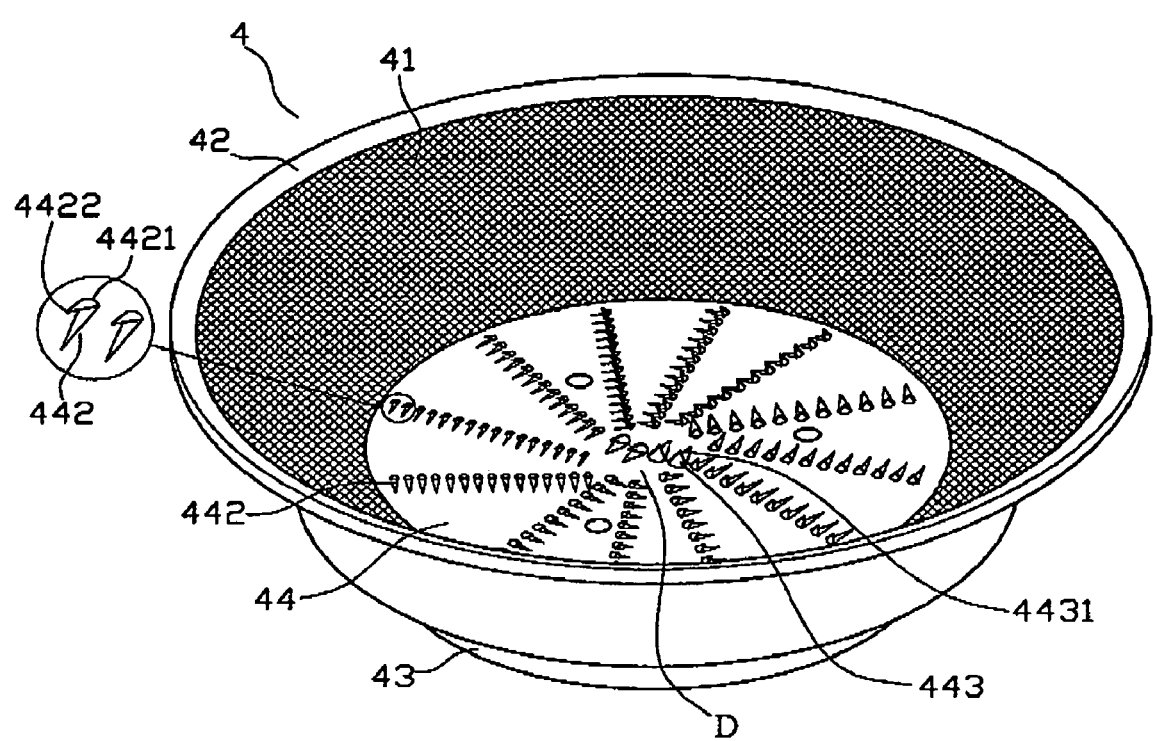
FIG. 6 is a perspective view of the cutter blade in accordance with the present invention.

As shown in FIG. 6, the cutter blade 4 is a conical member with surrounding being provided with a filter 41, and the juice of the crushed food stuff flows through the filter 41. The upper end of the filter is mounted to the top edge of a support component 42. The bottom end of the filter 41 is positioned at the bottom seat 43, and the blade 44 is positioned at the bottom seat 43 at the interior bottom section of the filter 41.

Figure 7:
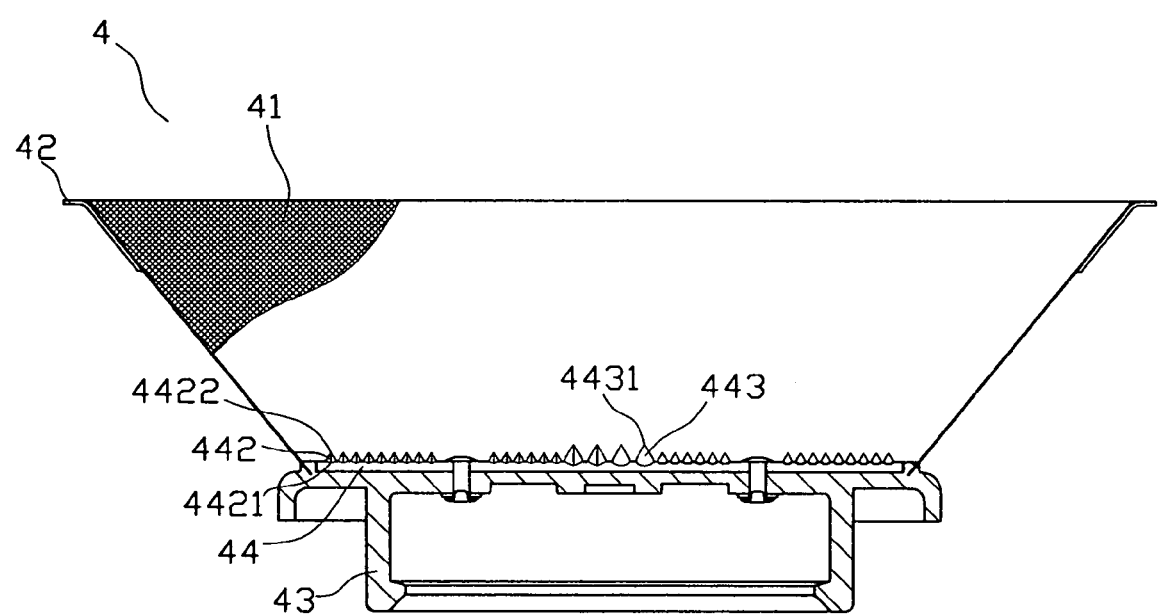
FIG. 7 is a sectional view of FIG. 6 in accordance with the present invention.

The blade 44 is circular in shape and is made from metal. The upper side of the blade is radially provided with a plurality of small toothed blades 442. The small toothed blade 442 has a semicircular seat section 4421 extending slopingly and upwardly to form a triangular tip 4422. In accordance with the present invention, the center portion of the blade 44 is provided with a plurality of large toothed blades 443. The shape of the large toothed blade 443 and the shape of the small toothed blade 442 are the same. The size of the large toothed blade 443 is larger than that of the small toothed blade 442 by about 1.5 to 2 times. The height of the large toothed blade 443 is higher than the small toothed blade 442 by about 1.3 to 1.7 times. The large toothed blades 443 are divided into two groups which are opposite in direction. As shown in FIG. 7, the large toothed blade 443 is in a horizontal line and the direction of the blade defines into two sets. When the cutter blade 4 is driven by a motor 7 to rotate, the large toothed blade 443 possesses kinetic energy, which can crush the center portion of the food stuff. In practical, the large toothed blade 443 can be arranged in a cross arrangement of a star shape.

In accordance with the present invention, the center cutting region D of the blade 44 is provided with a plurality of large toothed blades 443. The blade body and height of the large toothed blade 443 are larger than the small toothed blade 442. With the mounting of the large toothed blade 443, when the cutter blade 4 rotates, the large toothed blade 443 at the center region of the blade 44 still possesses kinetic energy. The tip 4431 of the large toothed blade 443 crushes the center region of the food stuff into tiny portions, and by rotating of the cutter blade 4 to produce centrifugal force, the crushed food stuff is thrown to the residual container 6.

The height of the large toothed blades blade 443 is larger than the small toothed blade 442, and this will crush the center portion of the food stuff, and will further assist the small toothed blade 442 to crush the food stuff. The installation of the center teeth blade 443 eliminates the formation of the blind cutting region. This will improve the crushing efficiency of the fruit and vegetable juice extractor. The large toothed blade 443 is formed from the blade 44 by punching. This will simplify the blade module of the juice extractor and the cost of manufacturing is lowered.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. In a fruit and vegetable juice extractor having a cutter blade, the improvement wherein said cutter blade is a conical member having a surrounding provided with a filter and a bottom provided with a blade, said blade having an upper side radially provided with a plurality of first toothed blades, each of said first toothed blades having a semicircular seat section extending slopingly and upwardly to form a triangular tip, said blade having a center portion provided with a plurality of second toothed blades which have same structure as said first toothed blades, said second toothed blades being larger than said first toothed blades in size by 1.5–2 times, said second toothed blades being higher than said second toothed blades by 1.3–1.7 times, said second toothed blades being divided into two groups which are opposite in direction.

2. In a fruit and vegetable juice extractor having a cutter blade as claimed in claim 1, wherein said second toothed blades are arranged in a horizontal line.

* * * * *